United States Patent
Minamiura et al.

(10) Patent No.: US 7,723,948 B2
(45) Date of Patent: May 25, 2010

(54) POWER SOURCE SYSTEM UTILIZING TIME DETECTION MEANS TO PROVIDE OPTIMUM CHARGE TO SECONDARY BATTERY FROM FUEL CELL

(75) Inventors: Takeshi Minamiura, Moriguchi (JP); Goro Fujita, Moriguchi (JP); Hiroki Kabumoto, Moriguchi (JP); Takashi Yasuo, Moriguchi (JP); Masahiro Makino, Moriguchi (JP)

(73) Assignee: Sanyo Electric Co., Ltd., Osaka (JP)

( * ) Notice: Subject to any disclaimer, the term of this patent is extended or adjusted under 35 U.S.C. 154(b) by 278 days.

(21) Appl. No.: 11/819,694

(22) Filed: Jun. 28, 2007

(65) Prior Publication Data

US 2008/0007200 A1    Jan. 10, 2008

(30) Foreign Application Priority Data

Jun. 30, 2006    (JP) .............................. 2006-181207

(51) Int. Cl.
*H01M 10/44*    (2006.01)
(52) U.S. Cl. ...................................... 320/101; 320/124
(58) Field of Classification Search ................. 320/101, 320/124
See application file for complete search history.

(56) References Cited

U.S. PATENT DOCUMENTS

| | | | | |
|---|---|---|---|---|
| 4,839,574 A | * | 6/1989 | Takabayashi | 320/101 |
| 4,883,724 A | * | 11/1989 | Yamamoto | 429/23 |
| 5,334,463 A | * | 8/1994 | Tajima et al. | 429/9 |
| 5,637,414 A | * | 6/1997 | Inoue et al. | 429/13 |
| 5,892,354 A | * | 4/1999 | Nagao et al. | 323/299 |
| 6,081,104 A | * | 6/2000 | Kern | 323/268 |
| 6,214,484 B1 | * | 4/2001 | Hauer | 429/9 |
| 6,534,950 B2 | * | 3/2003 | LeBoe | 320/104 |
| 6,555,989 B1 | * | 4/2003 | Pearson | 320/101 |

(Continued)

FOREIGN PATENT DOCUMENTS

| | | |
|---|---|---|
| JP | 2006-40787 | 2/2006 |
| JP | 2006-54075 | 2/2006 |

OTHER PUBLICATIONS

"Cell Application Handbook", pp. 62-76, ISBN4-7898-3446.8, edited by Transistor Technology Edition Department, CQ Publishing Co., Ltd.

*Primary Examiner*—Edward Tso
*Assistant Examiner*—Manuel Hernandez
(74) *Attorney, Agent, or Firm*—McDermott Will & Emery LLP

(57) ABSTRACT

There is disclosed a power source system capable of lengthening life and realizing a highly efficient operation while meeting user's needs. The power source system includes a fuel cell which generates power by an electrochemical reaction between a fuel and an oxidizing agent, and a secondary battery which is charged and discharged, wherein the secondary battery is charged by the fuel cell, and the power is taken from the secondary battery. The power source system further comprises a charge control unit which charges the secondary battery with the power generated by the fuel cell, and this charge control unit has a function of switching a mode to charge the secondary battery by the fuel cell in accordance with a frequency with which the power is taken from the secondary battery.

7 Claims, 8 Drawing Sheets

| | | ILLUMINANCE SENSOR | |
|---|---|---|---|
| | | ON | OFF |
| TIME | DAYTIME (6:00 TO 20:00) | CHARGE START<br>CHARGE RATIO 96%<br>CHARGING RATE 1 CA (< 80%) | CHARGE START<br>CHARGE RATIO 96%<br>CHARGING RATE 0.2 CA (< 80%) |
| | NIGHTTIME (20:00 TO 6:00) | CHARGE START<br>CHARGE RATIO 46%<br>CHARGING RATE 1 CA (< 80%) | CHARGE START<br>CHARGE RATIO 46%<br>CHARGING RATE 0.2 CA (< 80%) |

A RANGE OF 80% TO 100% INDICATES CHARGE AT A CONSTANT VOLTAGE (CONTROLLED VOLTAGE : 4.2 V)

CA IS AN INDEX OF CELL CHARGE/DISCHARGE, AND IS CALCULATED BY A CHARGE CURRENT (mA) / A CELL CAPACITY (mAh)

1 CA CORRESPONDS TO A CURRENT WITH WHICH THE CELL CAN FULLY BE CHARGED IN ONE HOUR 0.2 CA CORRESPONDS TO A CURRENT WITH WHICH THE CELL CAN FULLY BE CHARGED IN FIVE HOURS

U.S. PATENT DOCUMENTS

| | | | |
|---|---|---|---|
| 6,559,621 B2 * | 5/2003 | Corless et al. | 320/103 |
| 6,811,908 B2 * | 11/2004 | Edlund et al. | 429/19 |
| 6,904,337 B2 * | 6/2005 | Ueda et al. | 700/295 |
| 7,144,646 B2 * | 12/2006 | Pearson | 429/21 |
| 7,418,315 B2 * | 8/2008 | Nakamura et al. | 700/296 |
| 7,456,604 B2 * | 11/2008 | Kurokami et al. | 320/101 |
| 2006/0188764 A1 * | 8/2006 | Nakamura et al. | 429/23 |

* cited by examiner

FIG. 3
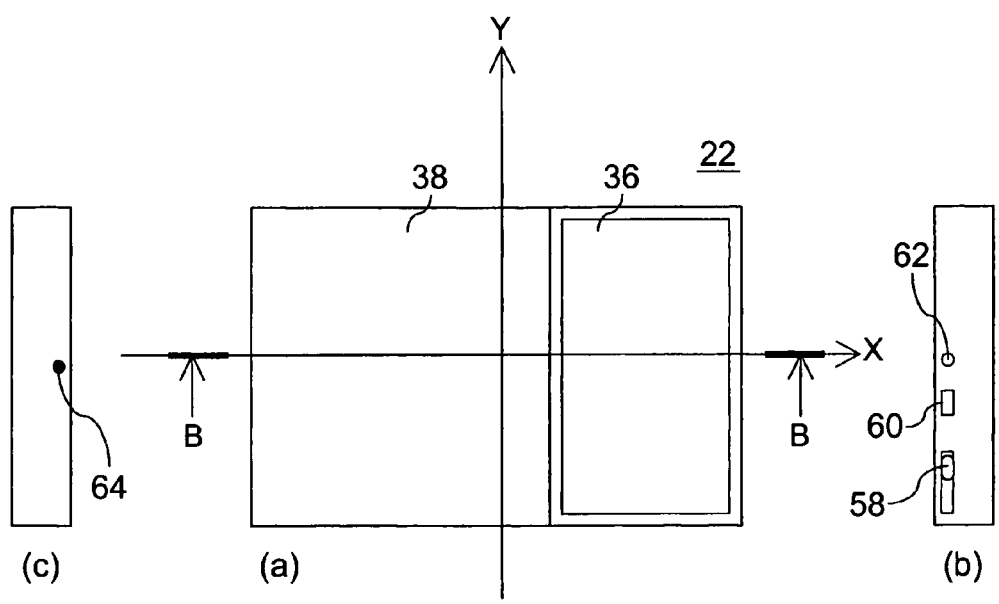
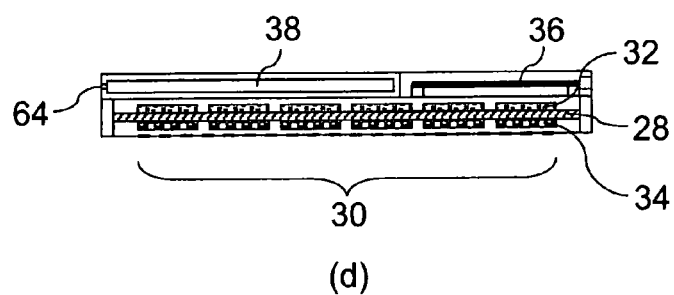

FIG. 7

|  |  | ILLUMINANCE SENSOR | |
|---|---|---|---|
|  |  | ON | OFF |
| TIME | DAYTIME (6:00 TO 20:00) | CHARGE START<br><br>CHARGE RATIO 96%<br><br>CHARGING RATE 1 CA (< 80%) | CHARGE START<br><br>CHARGE RATIO 96%<br><br>CHARGING RATE 0.2 CA (< 80%) |
| | NIGHTTIME (20:00 TO 6:00) | CHARGE START<br><br>CHARGE RATIO 46%<br><br>CHARGING RATE 1 CA (< 80%) | CHARGE START<br><br>CHARGE RATIO 46%<br><br>CHARGING RATE 0.2 CA (< 80%) |

A RANGE OF 80% TO 100% INDICATES CHARGE AT A CONSTANT VOLTAGE (CONTROLLED VOLTAGE : 4.2 V)

CA IS AN INDEX OF CELL CHARGE/DISCHARGE, AND IS CALCULATED BY A CHARGE CURRENT (mA) / A CELL CAPACITY (mAh)

1 CA CORRESPONDS TO A CURRENT WITH WHICH THE CELL CAN FULLY BE CHARGED IN ONE HOUR 0.2 CA CORRESPONDS TO A CURRENT WITH WHICH THE CELL CAN FULLY BE CHARGED IN FIVE HOURS

POWER SOURCE SYSTEM UTILIZING TIME DETECTION MEANS TO PROVIDE OPTIMUM CHARGE TO SECONDARY BATTERY FROM FUEL CELL

TECHNICAL FIELD

The present invention relates to a power source system using a fuel cell which generates power by an electrochemical reaction between a fuel and an oxidizing agent.

BACKGROUND

A fuel cell is a device which generates electric energy from hydrogen (a fuel) and oxygen (an oxidizing agent), and it can obtain a high power generation efficiency. A main characteristic of the fuel cell is that it carries out direct power generation without any process of thermal energy or kinetic energy as in a conventional power generation system, and hence the high power generation efficiency can be expected even with a small scale. Another characteristic of the fuel cell is that it discharges less amounts of nitrogen compounds and the like, and generates less noise or less vibration, which means excellent environmental properties. As understood from the above, the fuel cell can effectively use chemical energy of the fuel and has eco-friendly properties. Therefore, the fuel cell is expected as an energy supply system for the 21st century, and much attention is attracted as a new power generation system which is promising in the future and which is usable in various applications for cosmos, vehicles and portable devices in a range from large-scaled power generation to small-scaled power generation. Accordingly, the technical development of the fuel cell has been promoted for practical use.

Above all, a solid polymer fuel cell has characteristics such as a low operating temperature and a high output density as compared with another type of fuel cell. Especially, in recent years, as one configuration of the solid polymer fuel cell, a direct methanol fuel cell (DMFC) has received attentions. The DMFC directly supplies an aqueous methanol solution as the fuel to an anode without changing properties of the solution, and obtains the power by an electrochemical reaction between the aqueous methanol solution and oxygen. Owing to this electrochemical reaction, carbon dioxide is discharged as a reaction product from the anode, and generated water is discharged as a reaction product from a cathode.

Since the aqueous methanol solution has high energy per unit volume as compared with hydrogen, is suitable for storage and has little danger of explosion or the like, the solution is expected to be used in a power source for a car, portable devices (a cellular phone, a laptop PC, a PDA, an MP3 player, a digital camera, a game unit and electronic dictionary (book)) and the like (e.g., see Japanese Patent Application Laid-Open Nos. 2006-040787 and 2006-054075).

Here, in the power generation system constituted using such a fuel cell, a system is adopted in which a chargeable/dischargeable secondary battery is once charged with the power generated by the fuel cell to store the power, and the power is taken from the secondary battery and supplied to a device, so that the power can steadily be supplied to the connected device.

In this case, it is preferable for a user of the device that the secondary battery is quickly charged or constantly fully charged. On the other hand, if the secondary battery is repeatedly charged or discharged in the vicinity of a remaining amount corresponding to 100% (a charge ratio), the cell might be deteriorated. Moreover, it is generally said that, as the cell is nearly fully charged, a storage state deteriorates (see "Cell Application Handbook" edited by Transistor Technology Edition Department, CQ Publishing Co., Ltd. (ISBN4-7898-3446-8). Avoidance of this problem is preferably taken into consideration. When the fuel cell is operated at a small current, the efficiency of the power generation improves. However, much time is required for charging the secondary battery at the small current.

The present invention has been developed to solve such conventional technical problem, and an object thereof is to provide a power source system in which life is lengthened and a highly efficient operation can be realized while meeting user's needs.

SUMMARY

A power source system of a first invention is characterized by including: a fuel cell which generates power by an electrochemical reaction between a fuel and an oxidizing agent; and a secondary battery which is charged and discharged, wherein the secondary battery is charged by the fuel cell, and the power is taken from the secondary battery, the system further comprising: charge control means for charging the secondary battery with the power generated by the fuel cell, this charge control means having a function of switching a mode to charge the secondary battery by the fuel cell in accordance with a frequency with which the power is taken from the secondary battery.

The power source system of a second invention is characterized in that, in the above invention, the mode to be switched by the charge control means includes a mode in which the secondary battery is rapidly charged and a mode in which the fuel cell generates the power with an efficiency higher than that of the mode to charge the secondary battery.

The power source system of a third invention is characterized in that, in the above inventions, the charge control means switches a current during the charging of the secondary battery, when the mode is switched.

The power source system of a fourth invention is characterized in that, in the above inventions, the charge control means switches and maintains a charge ratio of the secondary battery during the mode switching.

The power source system of a fifth invention is characterized in that, in the above inventions, the charge control means has operation means for switching the mode in accordance with the frequency with which the power is taken from the secondary battery.

The power source system of a sixth invention is characterized in that, in the above inventions, the charge control means includes illuminance detection means for detecting brightness of a surrounding area, and switches the mode based on a relation between the frequency with which the power is taken from the secondary battery and the brightness of the surrounding area.

The power source system of a seventh invention is characterized in that, in the above inventions, the charge control means includes time limit means, and switches the mode based on a relation between the frequency with which the power is taken from the secondary battery and a time zone.

The power source system of the first invention includes: the fuel cell which generates the power by the electrochemical reaction between the fuel and the oxidizing agent; and the secondary battery which is charged and discharged. The secondary battery is charged by the fuel cell, and the power is taken from the secondary battery. Moreover, the system further comprises: the charge control means for charging the secondary battery with the power generated by the fuel cell. This charge control means has the function of switching the mode to charge the secondary battery by the fuel cell in accordance with the frequency with which the power is taken from the secondary battery. For example, in a case where the frequency with which the power is taken from the secondary battery is high, when the mode is switched to the mode in which the secondary battery can rapidly be charged and/or the mode in which the charge ratio of the secondary battery is maintained to be high, the secondary battery can constantly or quickly be charged fully, and the user's needs can be met.

On the other hand, in a situation in which the frequency with which the power is taken from the secondary battery is low, the mode is switched to the mode in which the power can highly efficiently be generated by the fuel cell to charge the secondary battery. For example, the current during the charging of the secondary battery is minimized. In consequence, the power generation efficiency of the fuel cell can be improved to reduce the consumption of the fuel. Moreover/alternatively, in a case where the mode is switched to the mode in which the charge ratio of the secondary battery is maintained to be small, the deterioration of the secondary battery can be suppressed.

In this case, when the system is provided with the operation means for switching the mode, a user can freely switch each mode in accordance with the frequency with which the power is taken from the secondary battery, and convenience is improved.

Moreover, in a case where the system is provided with the illuminance detection means for detecting the brightness of the surrounding area and the mode is switched by assuming that, for example, the frequency with which the power is taken from the secondary battery is high at daytime when the surrounding area is bright and the frequency is low at nighttime when the surrounding area is dark, the above-mentioned modes can automatically be switched.

Furthermore, even in a case where the time zone when the frequency with which the power is taken from the secondary battery is high is distinguished from the time zone when the frequency is low by the time limit means to switch the mode in accordance with this time zone, the above-mentioned modes can automatically be switched.

BRIEF DESCRIPTION OF THE DRAWINGS

FIG. 3 shows a constitution of a fuel cell of the power source system of FIG. 1, and shows (a) a top plan view, (b) a right side view, (c) a left side view, and (d) a sectional view cut along the B-B line;

FIG. 7 is a diagram showing a matrix of control to be performed by a microcomputer including the charge/discharge circuit of FIG. 6.

DETAILED DESCRIPTION OF THE EMBODIMENTS

Figure 1:
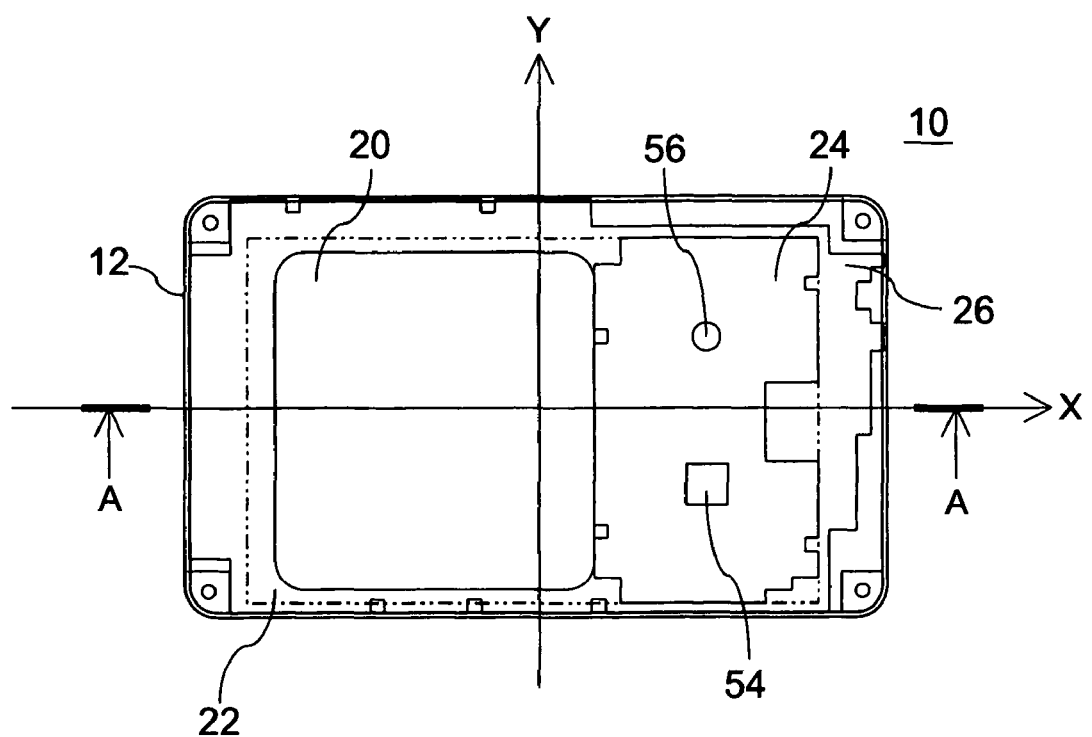
FIG. 1 is a top plan view showing an inner constitution of a power source system according to the present invention.
Figure 2:
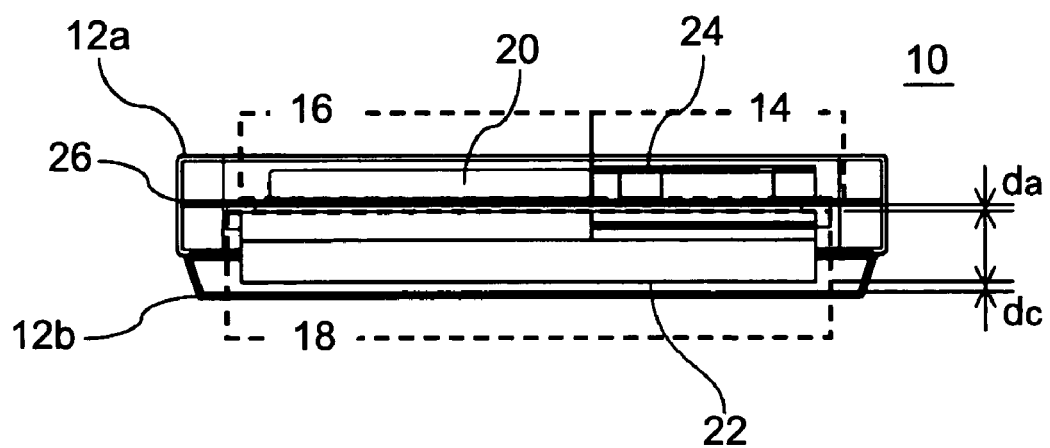
FIG. 2 is a sectional view cut along the A-A line of FIG. 1.

Next, an embodiment of the present invention will be described in detail with reference to the drawings. FIG. 1 is a top plan view showing an inner constitution of a power source system 10 according to the present invention, and FIG. 2 is a sectional view cut along the A-A line of FIG. 1. The power source system 10 of the present invention will hereinafter be described in detail with reference to FIG. 2. The power source system 10 roughly includes a control section 14, a power storage section 16 and a power generating section 18 arranged in a housing 12 including an upper housing 12a and a lower housing 12b.

The control section 14 of the power source system 10 controls an operation of the whole power source system 10 so as to select whether to store the power generated by the power generating section 18 in the power storage section 16 or directly supply the power to an external load (not shown).

The power storage section 16 of the power source system 10 includes a chargeable and dischargeable secondary battery, and a lithium ion battery (hereinafter referred to as the "LIB") 20 is used in the present embodiment.

The power generating section 18 of the power source system 10 includes a fuel cell 22. A direct methanol fuel cell (hereinafter referred to as the "DMFC") constituted by supplying an aqueous methanol solution or pure methanol (hereinafter referred to as the "methanol fuel") to an anode (not shown) is used.

(1) Inner Constitution

Positions of a control substrate 24, the LIB 20 and the fuel cell 22 of the control section 14 are fixed by a holder 26 which holds these components. When the holder 26 is fixed to the upper housing 12a, components such as the control substrate 24, the LIB 20 and the fuel cell 22 are fixed to the inside of the housing 12. The components are arranged so that the control substrate 24 and the LIB 20 are positioned on the holder 26 and the fuel cell 22 is positioned under the holder 26, when the power source system 10 is steadily arranged. Here, to steadily arrange the power source system 10 (steady arrangement) means that, if the system has legs as shown in FIG. 2, the power source system 10 is disposed on a horizontal or a substantially horizontal (±10°) base so as to ground the legs on the base. In a case where the system does not have any leg, the system is disposed so as to be grounded on the base, while such a comparatively large surface that the system does not easily fall when receiving vibration is disposed as a bottom surface. The surface is not provided with a user interface such as a button or a display unit.

When the control substrate 24 is disposed on the power source system 10, the user interface is disposed in an upper part. Therefore, the interface is easily used by a user of the power source system 10. When the control substrate 24 is disposed closer to the user interface, a wiring line space can be reduced. It is preferable that the fuel cell 22 has an electrode area which is as large as possible. In this case, a power generation capability can be increased. The fuel cell 22 is basically operated so as to generate constant power. However, the fuel cell can cope with a case where large power is requested from the load. In addition, even when an amount of the power requested from the load is small as compared with the power generating capability of the fuel cell 22, the power is steadily generated. Therefore, deterioration of the fuel cell 22 due to overload can be prevented. Therefore, it is preferable to arrange the fuel cell 22 at a position where the electrode area which is as large as possible is obtained in the housing 12. To solve the problem, in the power source system 10, since the control substrate 24 is arranged at the upper part of the housing 12, the fuel cell 22 is arranged at a lower part.

FIG. 3 shows a specific constitution of the fuel cell 22, and shows (a) a top plan view, (b) a right side view, (c) a left side view, and (d) a sectional view cut along the B-B line. In the fuel cell 22 for use in the present power source system 10, a fuel cell module 30 is used which is referred to as a planar module and in which a plurality of sets of electrodes are arranged and connected in series on one electrolytic film 28. A liquid methanol fuel is supplied to an anode 32 of the fuel cell 22 to generate carbon dioxide (a gas) as a product. Therefore, the anode is arranged on an upper surface of the electrolytic film 28 so that the fuel is supplied and the product is discharged smoothly by using gravity, when the system is steadily arranged. On the other hand, air is supplied as an oxidizing agent to a cathode 34 to generate water as the product. At this time, oxygen molecules 1.5 times more than methanol molecules are required. Therefore, a gap between the cathode 34 and the lower housing 12b or the holder 26 is set to be larger than a gap between the anode 32 and the lower housing or the holder specifically in a range of $10d_a \geq d_c > d_a$.

A fuel cell control section 36 instructs whether or not to operate the fuel cell 22 (generate the power), specifically whether or not to connect the fuel cell 22 to the load. In consideration of the wiring line space, the fuel cell control section 36 is also arranged in the vicinity of the control section 14 of the power source system 10. In the fuel cell 22 of the embodiment, the fuel cell control section is arranged right under the control section 14 and at an upper part of the fuel cell module 30. In a space of the upper part of the fuel cell module 30, which is not provided with the fuel cell control section 36, a fuel tank 38 is arranged, so that the space is effectively used. Moreover, conduction of heat from the fuel cell module 30 to the control substrate 24 and the LIB 20 is shielded by the fuel cell control section 36 and the fuel tank 38. Furthermore, a gap $d_a$ is disposed between the fuel cell 22 and the holder 26, a space is also disposed between the holder 26 and the control substrate 24, the LIB 20 is disposed on the fuel tank 38 to which the heat is not easily conducted, and the holder 26 is fixed to the upper housing 12a substantially over the whole periphery of the upper housing excluding a space for a wiring line. Therefore, a space above the holder 26 is thermally separated from a space below the holder.

As apparent from FIGS. 1 and 3, the present power source system 10 and the fuel cell 22 have an inner constitution in which they are arranged substantially symmetrically with respect to an X-axis and non-symmetrically with respect to a Y-axis. When the system is non-symmetrically arranged in a longitudinal direction, a temperature difference is easily made in the housing 12, and the resultant temperature gradient causes convection so that air can easily flow from or into ventilation holes 166 disposed at the lower housing 12b.

(2) Outer Constitution

Figure 4:
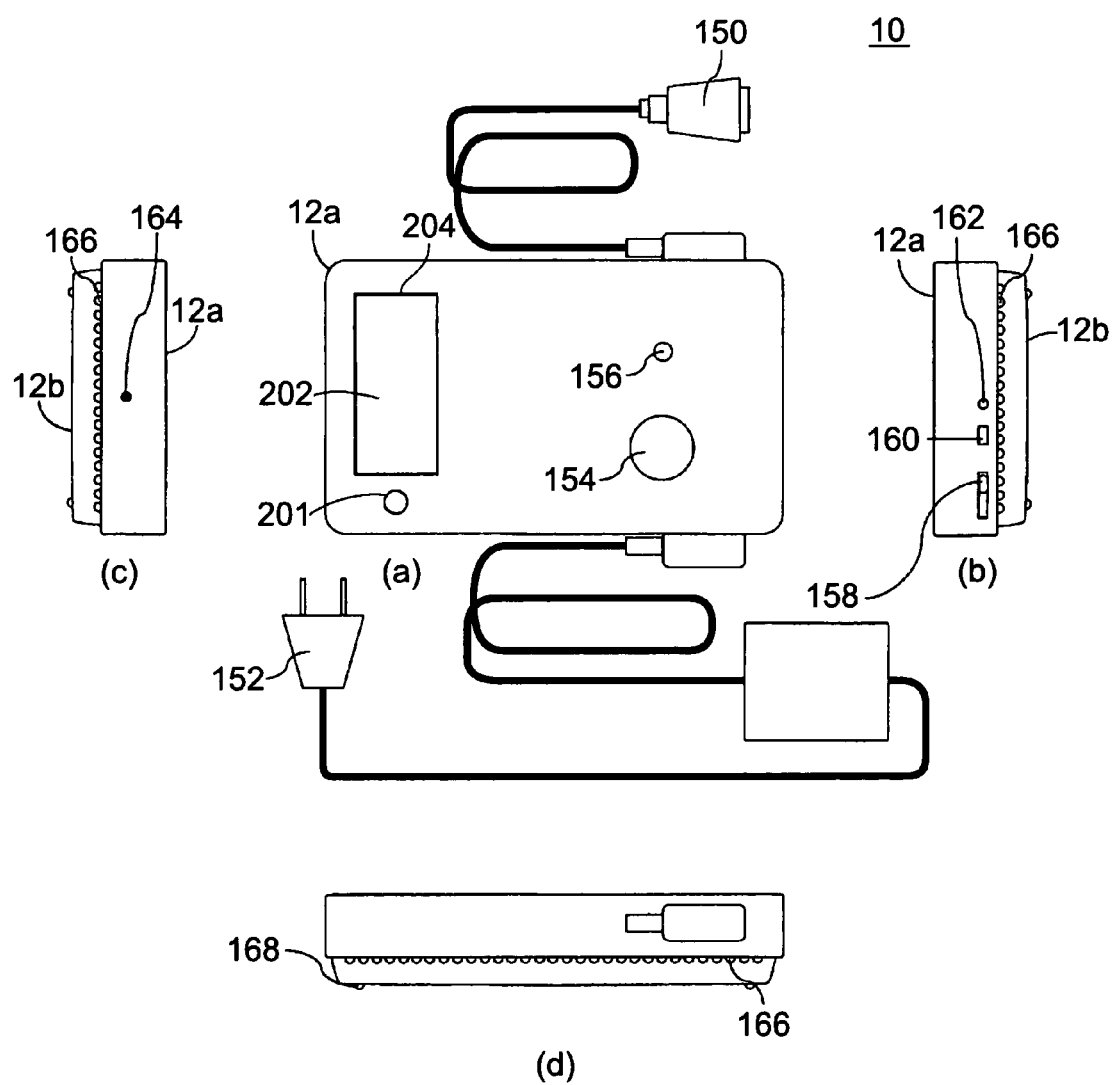
FIG. 4 shows an appearance of the power source system of FIG. 1, and shows (a) a top plan view, (b) a right side view, and (c) a left side view.

Next, an outer constitution of the power source system 10 having the above-mentioned inner constitution will be described. FIG. 4 shows an appearance of the power source system 10, and shows (a) a top plan view, (b) a right side view and (c) a left side view. The power source system 10 includes a power supply connector 150 which is disposed at one side surface of the system and which supplies power to an external load such as a cellular phone, and a power receiving connector 152 which is disposed at the other side surface and which receives supply of the power from a commercial power source. Reference numeral 154 is a check button. When the check button 154 is pressed and a display unit (LED) 156 lights, it is indicated that the power source system 10 can supply power to the external load. When the check button is pressed and the LED 156 blinks or does not light, the LIB 20 has an only small remaining amount of the power and may be charged. Furthermore, it is indicated that the power cannot be supplied to the external load. The check button 154 can be pressed to confirm a state of the power source system 10.

A slidable switch on a right side surface is a main power switch 158 interposed between the fuel cell module 30 and the fuel cell control section 36, and this switch electrically connects the fuel cell module 30 to the load. A push-type switch is a starting switch 160 which starts the fuel cell 22. When the starting switch 160 is pressed, the fuel cell 22 starts generating the power, and an LED 162 lights. That is, when the starting switch 160 is pressed and the LED 162 lights, the fuel cell 22 indicates such a state as to generate the power. In this state, the fuel cell is charged, when a pressure of the LIB 20 is below a predetermined voltage. When the LED 162 does not light, it is indicated that the fuel cell 22 has a shortage of the fuel and that the fuel tank 38 needs to be replenished with the methanol fuel.

When the LED 162 does not light as described above, the tank needs to be replenished with the methanol fuel. To replenish the tank with the methanol fuel, a fuel resupply hole 164 is disposed on a left side surface of the system. This fuel resupply hole 164 communicates with the fuel tank 38 disposed in the system. The methanol fuel can be supplied to the fuel tank 38 via the fuel resupply hole 164 by fuel resupply means such as an injector. An upper surface and a lower surface of the lower housing 12b are not shown, but four surfaces of the lower housing are provided with ventilation holes 166. Air flows into the power source system 10 through the ventilation holes 166, and carbon dioxide and water flow from the system through the holes. Reference numeral 168 is a leg disposed on a bottom surface of the lower housing 12b. When the power source system 10 is steadily arranged on a base such as a desk, a space is made between the bottom surface of the lower housing 12b and the desk. Since the air is circulated through the space, heat can be taken from the fuel cell 22.

(3) Control Circuit

Figure 5:
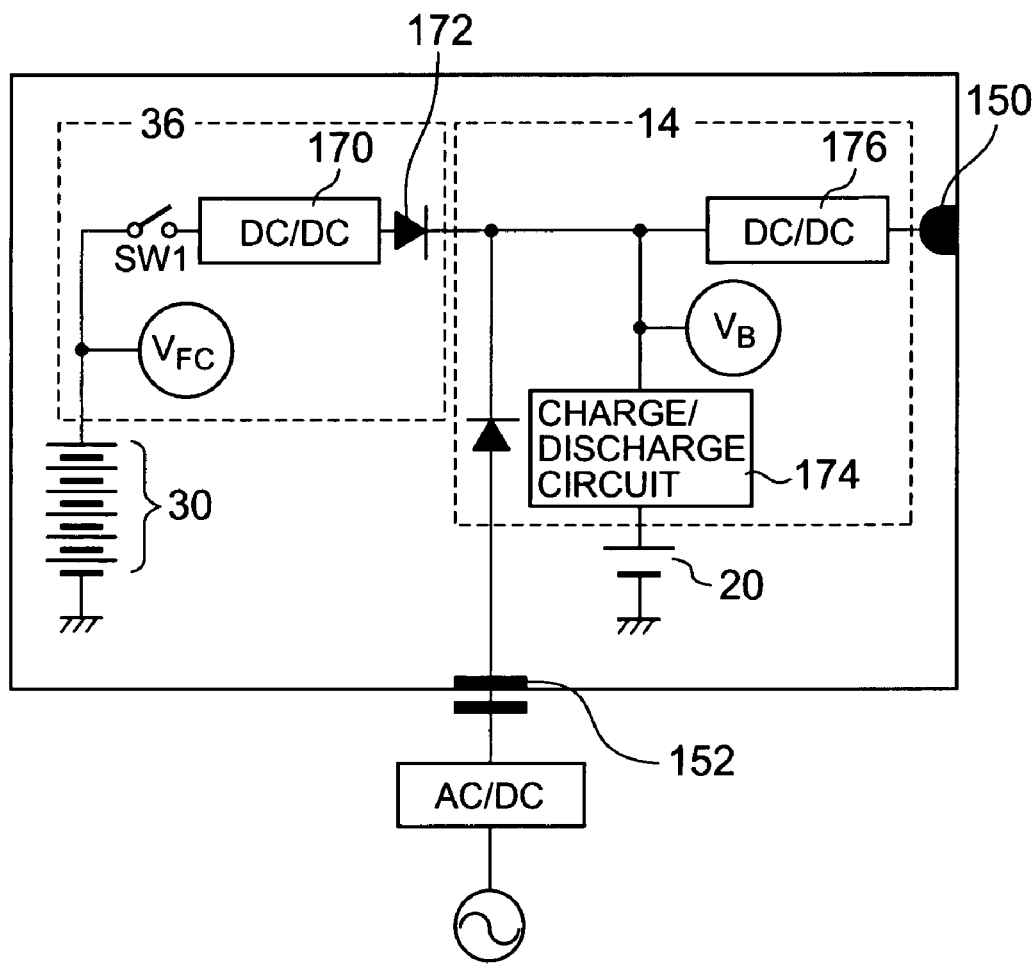
FIG. 5 is a diagram showing a circuit constitution of the power source system of FIG. 1.

Next, a circuit constitution which realizes the above-mentioned operation will be described. FIG. 5 is a circuit constitution diagram showing a circuit constitution according to the present embodiment. An SW 1 cooperates with the main power switch 158, and has a switch mechanism which connects the fuel cell module 30 to a DC/DC converter 170. When the starting switch 160 is pressed, the DC/DC converter 170 starts operating. When the switch mechanism SW 1 closes to electrically connect the fuel cell control section 36 including the DC/DC converter 170 to the fuel cell module 30, the fuel cell control section 36 detects a total voltage $V_{FC}$ of the fuel cell module 30, and judges from a value of $V_{FC}$ whether the tank is filled with the methanol fuel or has the shortage of the fuel. That is, in the shortage of the fuel, the total voltage $V_{FC}$ decreases. Therefore, a lower limit threshold value is set beforehand. When the detected $V_{FC}$ is above the lower limit threshold value and the starting switch 160 is pressed, the LED 162 lights. When the detected $V_{FC}$ is below the lower limit threshold value and the starting switch 160 is pressed, the LED 162 does not light.

The fuel cell module 30 is connected to the LIB 20 through the switch mechanism SW 1, the DC/DC converter 170 and a commutating element (a diode) 172 via a charge/discharge circuit 174 which is charge control means according to the present invention. Moreover, the module is connected to the external load via a DC/DC converter 176. The charge/discharge circuit 174 supplies the power generated by the fuel cell 22 to the external load, when a voltage $V_B$ of the LIB 20 is lower than a set voltage V1 and the external load is connected. When the voltage $V_B$ of the LIB 20 is lower than the set voltage V1 and the external load is not connected, the power is supplied to the LIB 20 to charge the LIB 20. When the LIB 20 is charged to set the voltage $V_B$ to be higher than an upper limit voltage V2, and when the external load is connected and the voltage $V_B$ of the LIB 20 is the set voltage V1 or more, the charge/discharge circuit 174 is capable of supplying the power to the fuel cell 22, but is on standby so that the power is not supplied from the fuel cell 22 to the LIB 20 or the external load.

The voltage $V_B$ is also linked with the check button 154 and the LED 156. When the check button 154 is pressed and the voltage $V_B$ is V1 or more, the LED 156 lights. When the voltage $V_B$ is lower than V1 and is a lower limit voltage V3 or more, the LED 156 blinks. When the voltage $V_B$ is lower than V3, the LED 156 does not light. In the present embodiment, the power receiving connector 152 is disposed so that the LIB 20 can be charged with the power from the commercial power source, and a cable provided with an AC adapter (an AC/DC converter) for charging the cellular phone may be connected. It is highly convenient for a user that the main power switch 158 (the switch mechanism SW 1) is constantly turned on so as to appropriately supply the power from the fuel cell 22, depending on the value of the voltage $V_B$. However, it is a factor for deterioration of the electrolytic film that a state continues over a long period in which the power can be supplied (the system is connected to the load) and a reaction for the power generation does not advance. Therefore, when the LIB 20 is sufficiently charged, it is preferable to turn off the main power switch 158 (SW 1: open). It is further preferable to close the ventilation holes 166 (air openings).

Figure 6:
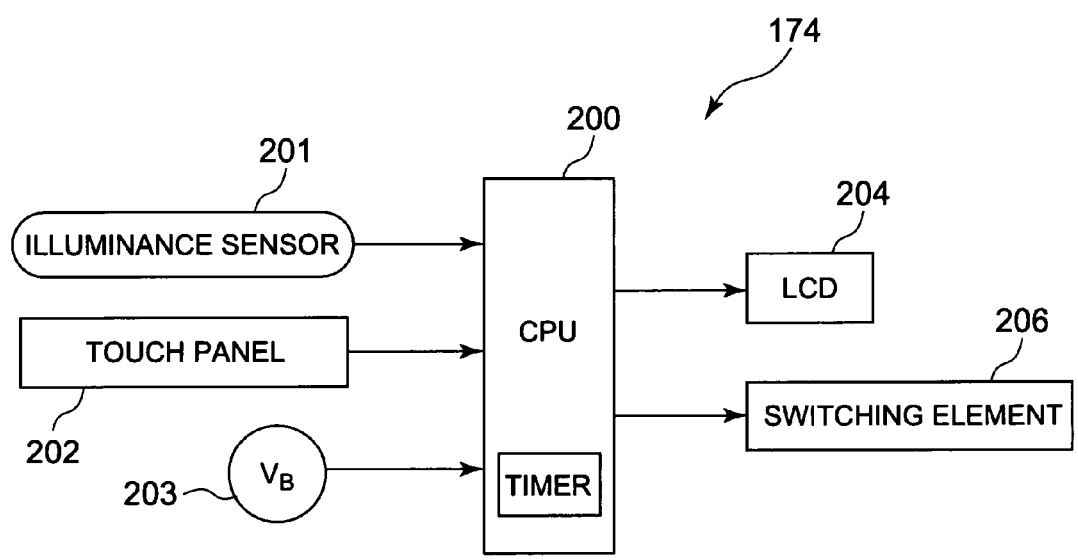
FIG. 6 is a function block diagram showing a charge/discharge circuit of a circuit constitution of FIG. 5.

Next, FIG. 6 shows a block diagram of the circuit constitution of the charge/discharge circuit 174. The charge/discharge circuit 174 includes a microcomputer 200 for general use. An input of this microcomputer 200 is connected to an illuminance sensor 201 which is illuminance detection means for detecting brightness around an area where the power source system 10 is disposed, a touch panel 202 which is operation means and a voltage sensor 203 which detects the voltage $V_B$. An output of the microcomputer 200 is connected to a display 204 (display means) including an LCD which displays each mode, operation buttons and the like as described later, and a switching element 206 which controls charging of the LIB 20 and discharging from the LIB 20.

The display 204 is disposed so as to be exposed on, for example, an upper surface of the upper housing 12a, and the touch panel 202 is disposed on the upper surface of this display 204. The illuminance sensor 201 is disposed beside the display 204, and detects brightness (illuminance) of a surrounding area of the power source system 10. The microcomputer 200 has a function of a timer (time limit means), and various settings to the microcomputer 200 are performed by display in the display 204 and an input operation from the touch sensor 202.

(4) Charge Control by Illuminance and Time Zone

Figure 8:
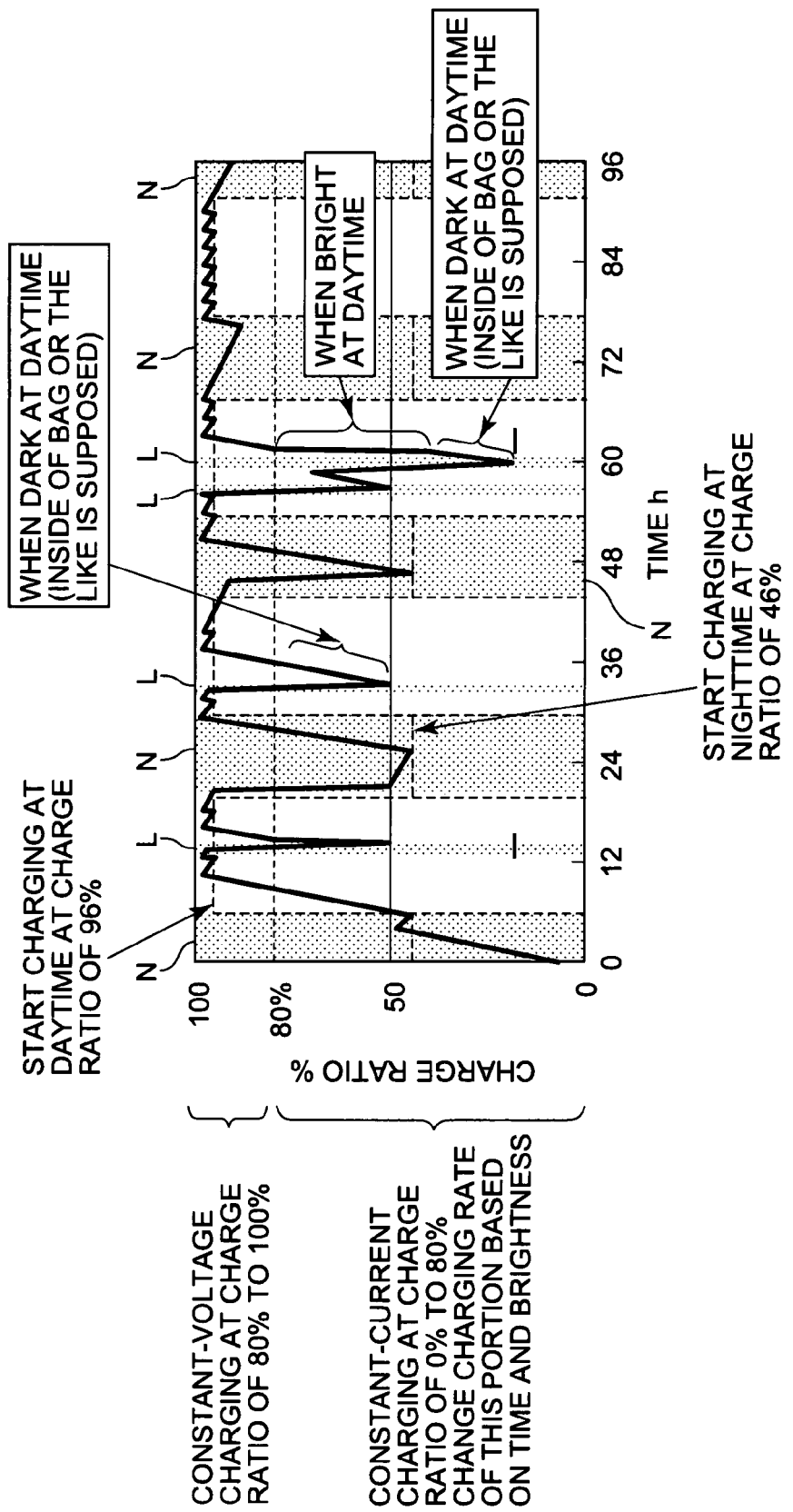
FIG. 8 is a diagram showing transition of a charge ratio of an LIB under the control of FIG. 7.

Subsequently, control of the microcomputer 200 of the charge/discharge circuit 174 will be described in a case where the LIB 20 is charged by the fuel cell 22. First, charge control based on the illuminance around the power source system 10 and the time zone will be described with reference to FIGS. 7 and 8. An output of the illuminance sensor 201 turns on in a case where the brightness around the power source system 10 is a certain illuminance which is brightness of a daytime or more. The output turns off in a case where the illuminance is less than an illuminance corresponding to a nighttime. In the timer of the microcomputer 200, a user sets beforehand a time zone of AM 6:00 to PM 8:00 which is the daytime (an activity time zone) and a time zone of PM 8:00 to AM 6:00 which is the nighttime (a non-activity time zone).

The time zones can freely be set to the microcomputer 200 by the display of the display 204 and the input operation to the touch panel 202. It is to be noted that, by the input operation to the touch panel 202, it can freely be set whether or not to execute the control based on the output of the illuminance sensor 201.

Here, the user has many chances to use, for example, the cellular phone at the daytime (the activity time zone). Conversely, the user has less chances at the nighttime (the non-activity time zone). Therefore, at the time zone of the daytime (the activity time zone), there is a high possibility that the cellular phone is connected to the power supply connector 150 of the power source system 10 and that the power is taken from the LIB 20 frequently to charge a battery of the cellular phone. However, it is considered that such a frequency decreases at the time zone of the nighttime. However, even at the time zone of the daytime, when the surrounding area is dark, there is a high possibility that the power source system 10 is put in, for example, a bag or the like and is not used. Therefore, in this case, the power is taken from the LIB 20 with less frequency. Conversely, even at the time zone of the nighttime, when the surrounding area is bright owing to room illumination or the like, there is a high possibility that the user works at the nighttime. Therefore, it is considered that the power is taken from the LIB 20 with greater frequency.

In the microcomputer 200, a judgment matrix is stored. The matrix is prepared in accordance with a relation between the frequency with which the power is taken from the LIB 20 and the brightness of the surrounding area of the power source system 10 and a relation between the frequency with which the power is taken from the LIB 20 and the time zone. FIG. 7 shows this matrix. Four modes of Mode 1 to Mode 4 are set to the microcomputer 200.

(4-1) Mode 1

When the surrounding area of the power source system 10 is bright (the illuminance sensor 201 turns on) at the time zone of the daytime (AM 6:00 to PM 8:00), the microcomputer 200 executes an upper left mode (method, system or configuration) Mode 1 of FIG. 7. In Mode 1, a charge ratio (a threshold value) of the LIB 20 at which the fuel cell 22 starts charging the LIB 20 is set to, for example, 96%. It is assumed that, when the charge ratio is, for example, less than 80%, a charging rate is 1 CA. It is also assumed that, when the charge ratio is 80% or more, the charging is performed at a constant voltage (4.2 V in the embodiment). This CA is an index of cell charge/discharge, and is calculated by a charge current (mA)/a cell capacity (mAh). In the embodiment, 1 CA corresponds to a current at which the LIB 20 can fully be charged in, for example, one hour.

As described above, in a case where the switch mechanism SW 1 of the power source system 10 closes and the starting switch 160 is pressed, when the charge ratio of the LIB 20 drops to 96% in Mode 1, the microcomputer 200 starts charging the LIB by the fuel cell 22. When the LIB is charged up to 100% (fully charged), the charging ends. In consequence, a high charge ratio of 96% to 100% is constantly maintained in the LIB 20. When the charge ratio is 80% or more, the charging is performed at the constant voltage. In a region where the ratio drops to be less than 80%, the charging rate is set to 1 CA (i.e., the current for the charging is set to be large) to rapidly charge the LIB 20.

That is, when the surrounding area of the power source system 10 is bright at the time zone of daytime, there is a high possibility that the power is taken from the LIB 20 most frequently (the cellular phone is used and needs to be charged). Therefore, the microcomputer 200 constantly maintains the high charge ratio of the LIB 20 owing to the power generation of the fuel cell 22. When the cellular phone is connected and the charge ratio drops, the LIB 20 is rapidly charged by the fuel cell 22. In consequence, a trouble is prevented from being generated in power supply to the cellular phone (in meeting user's request). The abscissa of FIG. 8 indicates a state in which the illuminance sensor 201 turns on. In the drawing, a state shown "when bright at the daytime" is Mode 1. It is to be noted that, in FIG. 8, regions N indicate the time zones of the nighttime, and other regions indicate the time zones of the daytime. Moreover, regions L indicate a state in which the cellular phone is connected.

(4-2) Mode 2

Subsequently, in a case where, even at the time zone of the daytime (AM 6:00 to PM 8:00), the power source system 10 is put in the bag or the like and the surrounding area is dark (the illuminance sensor 201 turns off), the microcomputer 200 executes upper right Mode 2 of FIG. 7. In Mode 2, the charge ratio (the threshold value) of the LIB 20 at which the fuel cell 22 starts charging the LIB 20 is set to, for example, 96%. It is assumed that, when the charge ratio is, for example, less than 80%, the charging rate is 0.2 CA. It is also assumed that, when the charge ratio is 80% or more, the charging is performed at the constant voltage (4.2 V in the embodiment). In the embodiment, 0.2 CA corresponds to a current at which the LIB 20 can fully be charged in, for example, five hours.

As described above, when the charge ratio of the LIB 20 drops to 96% in Mode 2, the microcomputer 200 starts charging the LIB by the fuel cell 22. When the LIB is charged up to 100% (fully charged), the charging ends. In consequence, a high charge ratio of 96% to 100% is constantly maintained in the LIB 20. In this case, when the charge ratio is 80% or more, the charging is performed at the constant voltage. In a region where the ratio drops to be less than 80%, the charging rate is set to 0.2 CA (i.e., the current for the charging is set to be small) to comparatively slowly charge the LIB (the charging is slowly performed at a small charging current as compared with the above-mentioned rapid charging).

That is, in a case where the power source system 10 is stored in the bag or the like and the surrounding area is dark even at the time zone of the daytime, there is a low possibility that the power is frequently taken out. Therefore, even while the charge ratio of the LIB 20 is maintained to be constantly high by the power generation of the fuel cell 22, the microcomputer 200 charges the LIB 20 at a comparatively small current. In a situation in which the power is taken from the LIB 20 with less frequency even at the daytime (the activity time zone) (in a situation in which the cellular phone is not used and does not have to be charged), even when the charge ratio of the LIB 20 is maintained to be high, the charging rate in charging the LIB 20 by the fuel cell 22 is set to be small, that is, the current during the charging is set to be small. In consequence, a power generation efficiency of the fuel cell 22 is set to be high (highly efficient power generation), and consumption of the fuel is suppressed. This is a state indicated "when dark at the daytime" in FIG. 8.

(4-3) Mode 3

Subsequently, in a case where, even at the time zone of the nighttime (PM 8:00 to AM 6:00), the user works and the surrounding area of the power source system 10 is bright owing to the room illumination or the like (the illuminance sensor 201 turns on), the microcomputer 200 executes lower left Mode 3 of FIG. 7. In Mode 3, the charge ratio (the threshold value) of the LIB 20 at which the fuel cell 22 starts charging the LIB 20 is reduced to, for example, 46%. It is assumed that, when the charge ratio is, for example, less than 80%, the charging rate is 1 CA. It is also assumed that, when the charge ratio is 80% or more, the charging is performed at the constant voltage (4.2 V in the embodiment).

In this manner, in Mode 3, the microcomputer 200 does not start the charging until the charge ratio of the LIB 20 drops to 46%. When the ratio drops to 46%, the fuel cell 22 starts the charging. When the LIB is charged up to 100% (fully charged), the charging ends. In consequence, the LIB 20 is maintained at an almost small charge ratio. In this case, when the charge ratio is 80% or more, the charging is performed at the constant voltage. In a region where the ratio drops to be less than 80%, the charging rate is set to 1 CA (i.e., the current for the charging is set to be large), and the LIB 20 is comparatively rapidly charged.

That is, the charge ratio of the LIB 20 is maintained to be small at the time zone of the nighttime, a situation in which the LIB 20 is charged or discharged at a large charge ratio is avoided, and deterioration of the LIB 20 is suppressed. However, in a case where the surrounding area is bright and the user acts even at the time zone of the nighttime, there is a high possibility that the power is comparatively frequently taken out (the cellular phone is used and needs to be charged). Therefore, in a state in which the charge ratio of the LIB 20 drops to be less than 80%, the microcomputer 200 rapidly charges the LIB 20 by the fuel cell 22. In consequence, even when the cellular phone is connected, any trouble is not generated in meeting the user's request.

(4-4) Mode 4

Subsequently, in a case where the surrounding area is dark at the time zone of the nighttime (PM 8:00 to AM 6:00) (the illuminance sensor 201 turns off), the microcomputer 200 executes lower right Mode 4 of FIG. 7. In Mode 4, the charge ratio (the threshold value) of the LIB 20 at which the fuel cell 22 starts charging the LIB 20 is reduced to, for example, 46%. It is assumed that, when the charge ratio is, for example, less than 80%, the charging rate is 0.2 CA. It is also assumed that, when the charge ratio is 80% or more, the charging is performed at the constant voltage (4.2 V in the embodiment).

In this manner, in Mode 4, the microcomputer 200 does not start the charging until the charge ratio of the LIB 20 drops to 46%. When the ratio drops to 46%, the fuel cell 22 starts the charging. When the LIB is charged up to 100% (fully charged), the charging ends. In consequence, the LIB 20 is maintained at an almost small charge ratio. In this case, when the charge ratio is 80% or more, the charging is performed at the constant voltage. Even in a region where the ratio drops to be less than 80%, the charging rate is set to 0.2 CA (i.e., the current value for the charging is set to be small), and the LIB 20 is comparatively slowly charged.

That is, the charge ratio of the LIB 20 is similarly maintained to be small at the time zone of the nighttime, a situation in which the LIB 20 is charged or discharged at a large charge ratio is avoided, and the deterioration of the LIB 20 is suppressed. The fuel cell 22 charges the LIB 20 at a comparatively small current. In a case where the user does not act at the nighttime in this manner, the power is taken from the LIB 20 with less frequency (the cellular phone is not used and has small necessity of being charged). Therefore, the charge ratio of the LIB 20 maintains to be small, the charging rate during the charging of the LIB 20 by the fuel cell 22 is set to be small, that is, the current during the charging is reduced to improve the power generation efficiency of the fuel cell 22, and the consumption of the fuel is suppressed. This is a state indicated by "the charge ratio of 46% at which the charging is started at the nighttime" in FIG. 8.

(5) Charge Control only by Illuminance

It is to be noted that in the described charge control (4), the four modes are selectively executed in accordance with a combination of the brightness of the surrounding area of the power source system 10 and the time zone. However, the control by the time zone may be turned off by the input operation to the touch panel 202, and the microcomputer 200 may be allowed to turn on or off the illuminance sensor 201 and perform such control as to change the mode in accordance with the only brightness. In this case, for example, when the surrounding area is bright, the microcomputer 200 executes Mode 1 as described above. When the surrounding area is dark, the microcomputer executes Mode 4.

(6) Charge Control by only Time Zone

Moreover, the control by the illuminance sensor 201 may similarly be turned off by the input operation to the touch panel 202, and the microcomputer 200 may be allowed to perform such control as to change the mode in accordance with the only time zone. In this case, for example, the microcomputer 200 executes Mode 1 as described above at the time zone of the daytime, and the microcomputer executes Mode 4 at the time zone of the nighttime.

(7) Manual Charge Control

Furthermore, similarly by the input operation to the touch panel 202 (the operation means), the control by the illuminance sensor 201 and the control at the time zone are both turned off. That is, a state in which the mode is automatically switched by the microcomputer 200 is turned off, and the mode of the microcomputer 200 may manually be set. In this case, in a case where the user judges that the frequency with which the power is taken from the LIB 20 increases, that is, a chance to charge the cellular phone increases, the microcomputer 200 is set so as to execute Mode 1 as described above. Conversely, in a situation in which the cellular phone is hardly used and the power is taken from the LIB 20 with less frequency, the microcomputer is set so as to execute Mode 4 as described above. In consequence, the user can freely change the mode, and convenience improves.

It is to be noted that, in the above-mentioned embodiment, the display 204 and the touch panel 202 are disposed at the power source system 10 so as to display information and switch the setting. However, in an external load such as the cellular phone having a display unit and an input switch, the information supplied from the microcomputer 200 of the charge/discharge circuit 174 may be displayed at the display unit on a load side, an operating situation of the power source system 10 may be displayed, and settings to the microcomputer 200 and the power source system 10 may be input on the load side by use of a power supply line to the external load.

Furthermore, in the embodiment, the fuel cell 22 is operated so as to generate the constant power, and a magnitude of the current during the charging of the LIB 20 and the threshold value to start the charging are controlled by the charge/discharge circuit 174. However, the present invention is not limited to this embodiment. The microcomputer 200 of the charge/discharge circuit 174 and the fuel cell control section 36 of the fuel cell 22 may cooperate to control the power generated by the fuel cell 22. In this case, instead of changing the charging rate of each mode described above, for example, an amount of the power to be generated by the fuel cell 22 is changed (e.g., the amount of the power to be generated is set to be large in Modes 1 and 3, and set to be small in Modes 2 and 4).

Furthermore, in the embodiment, the power source device is described as a DMFC. But present invention can be applied to a fuel cell which uses a hydrogen as a fuel.

What is claimed is:

1. A power source system utilizing time detection means to provide optimum charge to a secondary battery from a fuel cell comprising,
    a fuel cell which generates power by an electromechanical reaction between a fuel and an oxidizing agent,
    a secondary battery with is charged and discharged, and
    a charge controller for charging the secondary battery with the power generated by the fuel cell, having an illumination detector for detecting brightness of a surrounding area, a time limit unit, and a microcomputer, wherein the microcomputer has been set
    at a first mode of charging the secondary battery by the fuel cell at a first charging rate and a first charge ratio when the illumination detector turns on by detecting predetermined illumination and the time limit unit detects the daytime,
    at a second mode of charging the secondary battery by the fuel cell at a second charging rate which is lower than the first charging rate when the illumination detector turns off by not detecting predetermined illumination and the time limit unit detects the daytime,
    at a third mode of charging the secondary battery by the fuel cell at a second charge ratio lower than the first charge ratio when the illumination detector turns on and the time limit unit detects the night time, and
    at a fourth mode of charging the secondary battery by the fuel cell at a third charging rate which is lower than the first charging rate and a third charging ratio which is lower than the first charge ratio when the illumination detector turns off and the time limit unit detects the nighttime.

2. The power source system utilizing the time detection means to provide optimum charge to the secondary battery from the fuel cell according to claim 1, wherein the second mode is a mode of charging at the second charging rate and the first charge ratio, and the third mode is a mode of charging at the first charging rate and the second charge ratio.

3. The power source system utilizing the time detection means to provide optimum charge to the secondary battery from the fuel cell according to claim 1, wherein the third charging rate is equal to the second charging rate, and the third charging rate is equal to the second charging rate, and the third charge ratio is equal to the second charge ratio.

4. The power source system utilizing the time detection means to provide optimum charge to the secondary battery from the fuel cell according to claim 2, wherein the third charging rate is equal to the second charging rate, and the third charge ratio is equal to the second charge ratio.

5. The power source system utilizing the time detection means to provide optimum charge to the secondary battery from the fuel cell according to claim 1, wherein the daytime includes 12 P.M. and the night time includes 12 A.M.

6. The power source system utilizing the time detector to provide optimum charge to the secondary battery from the fuel cell according to claim 2, wherein the day time includes 12 P.M. and the night time includes 12 A.M.

7. The power source system utilizing the time detector to provide optimum charge to the secondary battery from the fuel cell according to claim 4, wherein the day time includes 12 P.M. and the night time includes 12 A.M.

* * * * *